United States Patent
Pirk et al.

(10) Patent No.: US 9,590,250 B2
(45) Date of Patent: Mar. 7, 2017

(54) LAYER SYSTEM, ENERGY STORE, AND METHOD FOR MANUFACTURING AN ENERGY STORE

(75) Inventors: Tjalf Pirk, Stuttgart (DE); Gilbert Moersch, Stuttgart (DE); Oliver Schecker, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 166 days.

(21) Appl. No.: 14/119,009

(22) PCT Filed: Mar. 20, 2012

(86) PCT No.: PCT/EP2012/054856
§ 371 (c)(1),
(2), (4) Date: Mar. 11, 2014

(87) PCT Pub. No.: WO2012/159786
PCT Pub. Date: Nov. 29, 2012

(65) Prior Publication Data
US 2014/0178769 A1    Jun. 26, 2014

(30) Foreign Application Priority Data
May 20, 2011   (DE) .................. 10 2011 076 177

(51) Int. Cl.
*H01M 4/62*   (2006.01)
*H01M 4/04*   (2006.01)
(Continued)

(52) U.S. Cl.
CPC ........... *H01M 4/62* (2013.01); *H01M 4/0404* (2013.01); *H01M 10/052* (2013.01);
(Continued)

(58) Field of Classification Search
CPC .... H01M 4/62; H01M 4/0404; H01M 10/052; H01M 10/0562
See application file for complete search history.

(56) References Cited

U.S. PATENT DOCUMENTS

| | | | |
|---|---|---|---|
| 2004/0191630 A1* | 9/2004 | Kawamura | H01M 4/134 429/231.95 |
| 2010/0203384 A1* | 8/2010 | West | H01M 2/08 429/209 |

(Continued)

FOREIGN PATENT DOCUMENTS

| | | |
|---|---|---|
| DE | 199 08 532 | 4/2000 |
| JP | 57 038417 | 3/1982 |

(Continued)

OTHER PUBLICATIONS

International Search Report and Written Opinion issued in PCT/EP2012/054856, dated Jun. 22, 2012.

*Primary Examiner* — Stewart Fraser
(74) *Attorney, Agent, or Firm* — Gerard Messina

(57) ABSTRACT

A layer system includes at least three layers, the three layers including a top electrode layer, a bottom electrode layer, and an electrolyte layer situated between the top electrode layer and the bottom electrode layer. The electrolyte layer has a solid-state electrolyte, and at least one of the top and bottom electrode layers includes a paste-like composite layer. A layer system of this type may be used to manufacture in particular energy stores, such as rechargeable lithium-ion accumulators, having an enhanced capacity. Moreover, a method for producing a layer system or an energy store is described.

24 Claims, 4 Drawing Sheets

(51) Int. Cl.
*H01M 10/052* (2010.01)
*H01M 10/0562* (2010.01)
*H01M 10/058* (2010.01)

(52) U.S. Cl.
CPC ..... *H01M 10/058* (2013.01); *H01M 10/0562* (2013.01); *Y02E 60/122* (2013.01); *Y02P 70/54* (2015.11)

(56) References Cited

U.S. PATENT DOCUMENTS

| | | | | |
|---|---|---|---|---|
| 2010/0216032 | A1* | 8/2010 | Baba | H01M 4/366 |
| | | | | 429/322 |
| 2011/0008673 | A1* | 1/2011 | Ugaji | H01M 4/134 |
| | | | | 429/188 |
| 2012/0015234 | A1* | 1/2012 | Iwaya | H01M 10/0562 |
| | | | | 429/152 |

FOREIGN PATENT DOCUMENTS

| | | |
|---|---|---|
| JP | 57 038418 | 3/1982 |
| JP | 2003/197208 | 7/2003 |
| WO | WO 00/13249 | 3/2000 |
| WO | WO 00/24068 | 4/2000 |
| WO | WO 00/06398 | 10/2000 |
| WO | WO 2004/015801 | 2/2004 |
| WO | WO 2011/144563 | 11/2011 |

\* cited by examiner

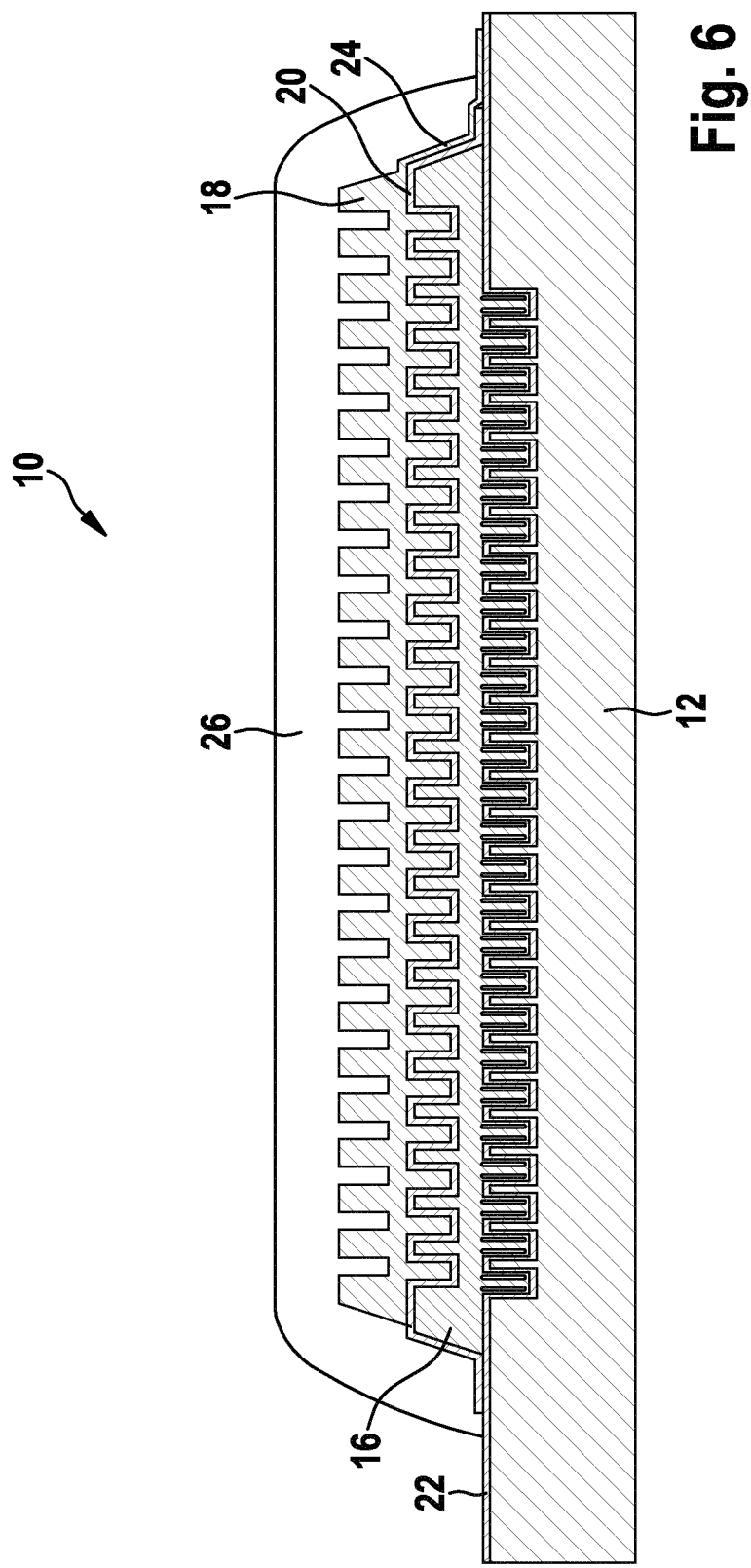

LAYER SYSTEM, ENERGY STORE, AND METHOD FOR MANUFACTURING AN ENERGY STORE

CROSS REFERENCE TO RELATED APPLICATION

The present application is the national stage entry of International Patent Application No. PCT/EP2012/054856, filed on Mar. 20, 2012, which claims priority to Application No. DE 10 2011 076 177.2, filed in the Federal Republic of Germany on May 20, 2011.

FIELD OF INVENTION

The present invention relates to a layer system, an energy store which includes the layer system, and a method for producing a layer system. The present invention relates in particular to a lithium-ion accumulator having enhanced capacity.

BACKGROUND INFORMATION

Lithium-ion batteries and lithium-ion accumulators are widely used nowadays. They are preferably used in particular in portable devices such as mobile telephones or mobile computers. Their advantages lie in particular in their high power density and capacity density. Attempts have previously been made to manufacture lithium ion accumulators with the aid of semiconductor processes in thin layer technology. However, the power levels have usually been limited due to the low quantities of active material in the thin two-dimensional layers. However, thin-layer accumulators of this type are already being utilized in energy-efficient devices.

One interesting prospect, also for applications which are not at the bottom end of the power spectrum, is also already being shown by so-called three-dimensional batteries. In batteries and accumulators of this type, the useful surface area for thin-layer batteries is folded over a structured substrate, so that for the same substrate base area, several times the capacity is stored, and in addition the stored charge is more quickly absorbed and released. Thus, higher power is also available.

A method for manufacturing a lithium primary battery, in particular for computers, is described in Japanese Application No. JP 2003-197208. In the method, a pair of polymeric layers, each having a chamber that is filled with an electrode active material, is laminated, with a separator situated in between. Electrode plates are situated at the outer sides in each case.

SUMMARY

The present invention comprises a layer system which includes at least three layers, the three layers including a top electrode layer, a bottom electrode layer, and an electrolyte layer situated between the top electrode layer and the bottom electrode layer, the electrolyte layer having a solid-state electrolyte, and at least one of the top and bottom electrode layers including a paste-like composite layer.

The layer system according to the present invention may in particular be included by an energy store or form same. Within the scope of the present invention, an energy store may in particular be any device which may store electrical energy and deliver it to consumers. An energy store within the scope of the present invention may in particular be a battery or an accumulator, such as a lithium-ion accumulator in particular. In addition, the layer system according to the present invention may be used in locations where the paste-like layer performs a function, but is sensitive to media, for example. The solid-state electrolyte layer is then used as a filter against aggressive media. Catalytic functions or use in a fuel cell may be named here as examples.

Within the meaning of the present invention, a paste-like composite layer may in particular be a layer which at least temporarily, i.e., during a certain stage of the production of a layer system or in particular of an energy store, for example, has paste-like properties, i.e., in particular is scrape-resistant. Within the scope of the present invention, a composite layer may in particular be a layer that is composed of various components which may assume different roles in the production process and in use. With regard to the components, a distinction may be made between active substances and auxiliary materials, for example. In the example of the electrode layers, active substances are, for example, the active materials for energy storage, and auxiliary materials may be electronic and ionic main components such as carbon black, graphite, LiPON, and fillers which influence the stability and flexibility of the composite layer, for example solvents or organic binders such as PVDF.

A layer system according to the present invention includes at least three layers, which preferably may be arranged successively and thus preferably directly adjacent to one another. The at least three layers are preferably situated in parallel and directly adjoin one another.

Two of the layers include, or are, electrode layers, and therefore have the properties of an electrode, in particular good electrical and ionic conductivity and good ion storage capability. At least one of the electrode layers includes, or is, a paste-like composite layer which has an increased ion storage capacity compared to conventional thin-layer batteries. The stored energy quantity or the ion storage capacity is a volumetric property of a material, since the volume of the electrode layer indicates the quantity of stored active components, such as lithium ions for the case of a lithium-ion accumulator. The ion storage capacity may therefore be set via a suitable thickness, for example. Suitable thicknesses are, for example, in a range of $\geq 5$ µm to $\leq 500$ µm, particularly preferred thicknesses are in a range of $\geq 30$ µm to $\leq 100$ µm. The ion storage capacity may also be a function of the active material used in the electrode, for example an anode storage material or a cathode storage material, or their proportion in the layer composition.

According to the present invention, both electrode layers may include a paste-like composite layer or be formed from same, or include only one of the electrode layers or are formed from such a composite layer. The respective other electrode layer may then be a conventional electrode known from lithium-ion accumulators, for example. In particular, the electrode which does not include a paste-like composite layer may be a thin-layer electrode made of the material typically used therein, for example lithium metal. However, it is clear that the further, or second, electrode, regardless of its composition, should have the properties of the electrode which is complementary to the first electrode, and should have an activity, for example lithium ion absorption capacity, which is adapted to the first electrode layer. In other words, one of the electrode layers should have the properties of a cathode, whereas the further electrode layer should have the properties of an anode. The choice of which layer the anode or the cathode is provided in is freely selectable.

For the case of a lithium-ion accumulator, the cathode layer has in particular a high chemical potential with respect to lithium, and suitably allows the storage of lithium, for example during discharging of a lithium accumulator. In one exemplary embodiment as an anode, the electrode layer in particular has a preferably low chemical potential with respect to the cathode, and in particular allows lithium storage during charging of a lithium-ion accumulator.

In addition, for the case that only one electrode layer includes a paste-like composite layer, this electrode layer may have an anode storage material, whereas the further electrode layer is formed from a conventional cathode material or contains same, for example a cathode material known from the manufacture of a thin-layer battery. Similarly, for the case that only one electrode layer has a paste-like composite layer, this electrode layer may have a cathode storage material, whereas the further electrode layer is formed from a conventional anode material or contains same, for example an anode material known from the manufacture of a thin-layer battery. For the case that both electrode layers have a paste-like composite layer, one of the electrode layers may have a cathode storage material as the active substance, whereas the other electrode layer may have an anode storage material as the active substance.

Consequently, either the bottom electrode layer or the top electrode layer may be made of a cathode storage material or include same, which, for example, is selected from the group of oxidic materials, in particular lithium-cobalt dioxide, lithium-manganese oxide spinel, nickel-containing mixed oxides, or lithium-iron phosphate. In addition, either the bottom electrode layer or the top electrode layer may be made of an anode storage material which, for example, is selected from the group composed of silicon, germanium, lithium, a carbon-containing material, or a metallic alloy.

A layer which has the function of an electrolyte is situated between the electrode layers. According to the present invention, this electrolyte layer includes, or is, a solid-state electrolyte. A solid-state electrolyte is a solid which is stable per se, in which the charge transport of ions may take place in particular within a solid-state matrix.

The solid-state electrolyte may advantageously already have a good ion conductivity in a range of $\geq 10^{-6}$ S/cm, as well as a low electrical conductivity of $\leq 10^{-12}$ S/cm. The electrolyte layer thus has a sufficient ion conductivity which is suitable, for example, for use as an electrolyte layer in batteries or accumulators, such as a lithium-ion accumulator. The electrolyte layer which includes the solid-state electrolyte is therefore usable as an electrolyte layer between the two electrode layers without further measures such as structural measures or manufacturing steps. Thus, for example, it is not necessary to add an electrolyte material during the manufacture in order to achieve suitable properties. In particular, it is not necessary to form cages made of an organic material, for example, in the matrix and to fill the cages with a liquid electrolyte, for example, in a further work step. Work steps as well as materials for producing the electrolyte layer may thus be dispensed with, which reduces the production costs of the layer system according to the present invention.

Furthermore, by dispensing with a conventional electrolyte such as a liquid electrolyte in particular, leakage of the layer system according to the present invention may be completely prevented. This may be advantageous, for example, since the components and electronic devices, for example, equipped with an energy store of this type would be damaged by leakage of the electrolyte. In addition, evaporation of the electrolyte is prevented, which prevents a malfunction of the energy store, for example, and also increases the maximum tolerable temperature of an energy store according to the present invention. Solderable energy stores may thus be manufactured using suitable materials in the electrode layers.

In addition, many electrolytes are associated with environmental problems. According to the present invention, disposal or reuse of the layer system according to the present invention, for example after damage, is thus simplified.

A solid-state electrolyte in a layer system according to the present invention, in particular in an energy store according to the present invention, offers an improved calendrical service life, and at the same time offers an improved service life with regard to the number of cycles of charging and discharging operations, for example due to limited degradation mechanisms.

The layer system according to the present invention may provide a thin-layer battery, for example, which combines the advantages of macroscopic batteries, such as those used in mobile telephones or portable computers, with the advantages of solid-state thin-layer batteries such as two-dimensional or three-dimensional batteries. In particular, the layer system according to the present invention as an energy store according to the present invention has high capacities, such as those to be produced for three-dimensional batteries. In the process, however, a manufacturing method may be sped up and simplified compared to conventional two-dimensional thin-layer batteries.

In addition, due to the design according to the present invention, a response may be easily made to potential advances, for example in the development of electrode pastes, without the need for complicated conversion of the manufacturing process.

Another advantage may be seen in the fact that, despite increased capacity, the layer system according to the present invention and the energy store according to the present invention may have a very compact design, and are therefore also usable for numerous mobile applications. For example, energy stores having 500 $\mu$Ah/cm$^2$ or greater and an overall height, including a possible unstructured substrate, of $\leq 200$ $\mu$m or even in a range of $\leq 100$ $\mu$m are implementable, so that even applications in areas such as smart cards or chip cards, or also in flat autonomous sensors for the formation of sensor networks, are possible.

It is also conceivable to scale the design of a layer system according to the present invention, for example having printed electrode layers and a solid-state electrolyte, to even larger dimensions and to thus integrate same into macroscopic batteries. The energy store according to the present invention therefore achieves an even wider field of application, since it is also suitable for applications using macroscopic batteries, for example mobile entertainment or communication devices, or even for applications in electromobility.

Within the scope of one exemplary embodiment of the layer system according to the present invention, the paste-like composite layer has a storage capacity of $\geq 200$ $\mu$Ah/cm$^2$, in particular $\geq 500$ $\mu$Ah/cm$^2$, particularly preferably $\geq 1$ mAh/cm$^2$. Such a storage capacity is easily possible using a paste-like composite layer due to the good adaptability to the desired specification, for example by varying the active material or its thickness. The specific storage capacity is greater than that known from conventional thin-layer batteries. High efficiency of the layer system according to the present invention, for example as an energy store, may thus be achieved.

Within the scope of another exemplary embodiment of the layer system according to the present invention, the paste-like composite layer includes an active substance, a binder, an electrically conductive material, and in particular an ionically conductive material. It may be provided, for example, that the electrically conductive material is at the same time ionically conductive. It may be particularly preferred for the paste-like compound to be composed of only the above-mentioned components. A paste-like composite layer formed in this way is easily and cost-effectively producible, and thus adaptable with great variability to the desired field of application. In addition, this type of paste-like compound is easily processed, which improves the production process of the layer system according to the present invention. The active substance may in particular be one that imparts to the electrode its property as a cathode or anode.

For the case of use as a cathode, the active substance includes, or is, in particular a cathode storage material that is selected from the group of oxidic materials, in particular lithium-cobalt dioxide ($LiCoO_2$), lithium-manganese oxide spinel ($LiMn_2O_4$), nickel-containing mixed oxides, or lithium-iron phosphate ($LiFePO_4$). For the case of use as an anode, the active substance includes, or is, in particular an anode storage material that is selected from the group composed of silicon (Si), germanium (Ge), lithium (Li), a carbon-containing material, or a metallic alloy.

The binder may include PVDF, PVDF-HDP, CMC, or SBR, for example, while the electrically conductive material may be graphite, carbon nanotubes, or carbon black, for example. The ionically conductive material may be lithium phosphorus oxynitride (LiPON), for example. In one particularly preferred exemplary embodiment, the paste-like composite layer includes 85% active substance and in each case 5% binder, ionically conductive material, and electrically conductive material, it also being advantageous to reduce the additions to the active material or active substance to a range of ≤3%.

Within the scope of another preferred exemplary embodiment of the present invention, at least one auxiliary material is provided in the paste-like composite layer. The at least one auxiliary material may be suitable in particular for improving the electronic properties of the corresponding layer, or for bringing about an improvement in the mechanical properties.

With reference to the electronic properties, the conductivity and/or ion storage capacity, for example, in particular for an electrode which is usable as an anode, may be improved in particular by the auxiliary material. In this function, carbon nanotubes may be provided in both electrode layers, regardless of whether a cathode or an anode is involved. It may also be preferred for the auxiliary material to include another material, in addition to the corresponding active substance, which is selected from the above-mentioned group of cathode storage materials, or for the auxiliary material to include a material which is selected from the above-mentioned group of anode storage materials. In particular, the chemical potential is optimized with respect to lithium, and the ion storage capacity is improved, by the above-described auxiliary materials.

In addition, the mechanical properties may also be improved by the auxiliary material. In this case, for example, the stability of the paste-like composite layer may be increased, so that the layer system according to the present invention does not have to be, for example, situated on a substrate. Suitable examples for an improvement of the mechanical strength include $SiO_2$, $Si_3N_4$, $Al_2O_3$, AlN, MgO, or also fibers such as glass fibers.

It is also particularly preferred for the at least one auxiliary material to be present in a quantity of 15% by weight.

In this way the desired effects may already be achieved without significantly adversely affecting the processability of the paste-like composite layer and also the production of the corresponding layers.

Within the scope of another exemplary embodiment of the layer system according to the present invention, the solid-state electrolyte is based on a material that is selected from the group composed of lithium phosphorus oxynitride (LiPON), lithium sulfur oxynitride (LiSON), lithium metaborate ($LiBO_2$), lithium silicophosphate, in particular doped with nitrogen (LiSiPON), lithium-sulfur-phosphorus compounds ($Li_2S$—$P_2S_5$), lithium, titanium, or tantalum oxides, or lanthanum garnets. For example, the solid-state electrolyte is built from or is composed of such materials, or includes such materials in chemically altered or modified form, for example. For example, the electrolyte may be, or include, lithium phosphorus oxynitride which is doped with boron or other materials. Solid-state electrolytes of this type have suitable ion and electron conductivities, and are also easily usable and processable in a production process, using known methods.

Within the scope of another exemplary embodiment of the present invention, the side of the top electrode layer and/or of the bottom electrode layer facing the electrolyte layer, and/or the electrolyte layer itself, may be at least partially structured. In this regard, structuring may in turn be formed in particular by a topography such as a comb structure, or some other structure which enlarges the active surface. In this exemplary embodiment it is thus possible to obtain enlarged transition surfaces between the individual functional layers, as the result of which the power of the layer system according to the present invention, for example as an energy store, may be improved.

It is also preferred for the layer system to include a substrate on which the bottom electrode layer is situated. The substrate may impart improved stability to the layer system, in particular for the case that the individual layers have low stability. This may be the case, for example, as the result of forming very thin layers. The substrate may be formed, for example, from rigid and in particular structurable materials, for example semiconductor materials such as silicon, which are used, for example, for rear sides of active elements such as integrated circuits, microsystem engineering components, or solar cells. Alternatively, flexible substrates may also be used which allow the subsequent introduction of such thin-layer batteries into microsystems such as smart cards, or which also allow scaling to macroscopic energy stores. However, the substrate material should have suitable properties, such as thermal resistance to soldering operations.

In this regard it may be particularly preferred for the side of the substrate facing the bottom electrode layer to be at least partially structured. Structuring of the substrate may be achieved, for example, by forming caverns in the substrate, or by a comb structure. Thus, in particular the height of the layer system according to the present invention may be reduced, and thus the compactness may be increased. An application in particular in small portable devices as energy stores, for example, may thus be further improved.

Within the scope of another advantageous exemplary embodiment of the layer system according to the present invention, a current collector layer is situated on the side of the bottom electrode layer and/or the top electrode layer opposite from the electrolyte layer. The current collector layer is used to improve the electrical conductivity of the corresponding electrode layer, and also to provide a suitably establishable contact of the electrode layer. For example, the current collector layer may be made of gold, platinum, aluminum, alloys, or other materials having good electrical conductivity.

Moreover, the present invention relates to an energy store which includes a layer system according to the present invention. In particular in an energy store, the mentioned advantages such as long service life and enhanced capacity and power are realized in a particularly advantageous manner.

Moreover, the present invention relates to a method for producing a layer system according to the present invention, in particular an energy store according to the present invention, including the following method steps:
a) providing a bottom electrode layer, in particular by application to a substrate;
b) applying a solid-state electrolyte layer to at least a portion of the bottom electrode layer; and
c) applying a top electrode layer to at least a portion of the solid-state electrolyte layer,
d) a paste-like composite compound being used at least for one of the bottom or the top electrode layers.

According to the present invention, the bottom electrode layer is provided in a first step. This may take place, for example, by applying the electrode layer to a substrate. For example, for the case that the bottom electrode layer includes a paste-like composite layer, the bottom electrode layer may be imprinted on the substrate or some other surface, or applied in some other way. Examples of processes include doctoring, template or screen printing processes, or injection processes. The thickness may be selected as a function of the selected active material and the desired capacity. In addition, suitable quality, composition, and planarity should be achieved in order to allow the application of further layers, for example due to compatibility of the interface with the adjacent layers and their deposition processes.

For the case that the bottom layer is a thin-layer electrode, for example, or is formed from same, the material for the bottom electrode layer depends on its intended function. For the case of use as a cathode, the material particularly preferably includes, or is, a cathode storage material that is selected from the group of oxidic materials, in particular lithium-cobalt dioxide ($LiCoO_2$), lithium-manganese oxide spinel ($LiMn_2O_4$), nickel-containing mixed oxides, or lithium-iron phosphate ($LiFePO_4$). For the case of use as an anode, the material is preferably in particular an anode storage material that is selected from the group composed of silicon (Si), germanium (Ge), lithium (Li), a carbon-containing material, or a metallic alloy. Materials of this type may be vapor-deposited or sputtered, for example. In principle, methods known from semiconductor processing may be used here.

A solid-state electrolyte layer is applied to at least a portion of the bottom electrode layer in a subsequent step. This may be achieved, for example, using processes such as sputtering processes, CVD processes, ALD processes, or vapor deposition processes. It should be ensured that the functionality, such as reliable electronic insulation, high ionic conductivity, and also thermal and/or mechanical stability in particular, is obtained, i.e., that the layers in particular have a low defect density as well as good homogeneity with regard to layer thickness and composition. Structuring of the layers may be carried out in particular in a sputtering or vapor deposition process using a shadow mask, or with the aid of laser structuring in a step following the application.

A top electrode layer is subsequently applied to at least a portion of the solid-state electrolyte layer. The top electrode layer may be made, for example, of a paste-like composite layer or designed as a thin-layer electrode. In this case, the statements concerning application of the bottom electrode layer apply.

According to the present invention, a particularly simple and quick production method is possible. The layers of the particular electrode layers or electrolyte layers may be applied one on top of the other in a rapid, simple, and cost-effective manner. For example, the application of a paste-like layer may take place using a conventional doctoring process or printing process. Structuring is possible in a simple and precise manner by using a screen or a template, or a laser. In addition, the properties of the paste-like composite layers may thus be set as desired and in a precisely defined manner. For example, the thickness and the geometry may be adapted to the desired application in a particularly simple and precise manner. Furthermore, auxiliary materials may be easily embedded in the paste-like layers in order to adapt mechanical as well as electronic properties of the particular layer in order to improve the properties of the layer system with regard to the desired field of application.

Further advantages and advantageous exemplary embodiments of the present invention are described in the following with reference to the accompanying drawings. It should be noted that the drawings have only a descriptive character, and are not intended to limit the present invention in any way.

BRIEF DESCRIPTION OF THE DRAWINGS

FIG. 6 shows a schematic sectional view of another exemplary embodiment of the layer system according to the present invention from the side.

DETAILED DESCRIPTION

Figure 1:
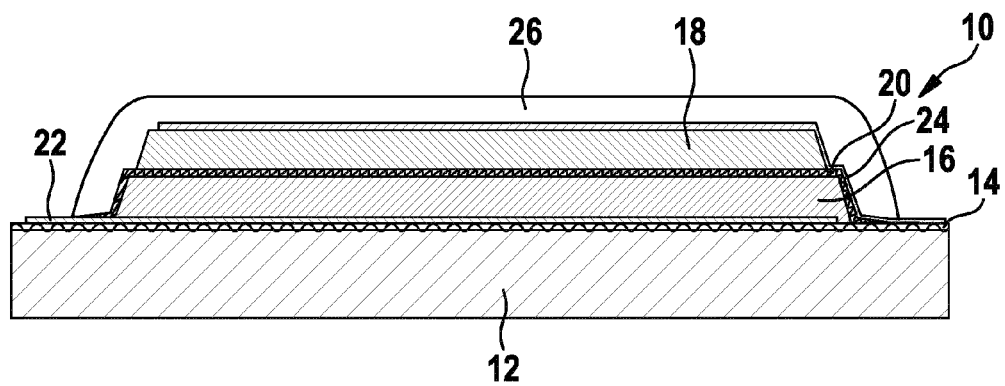
FIG. 1 shows a schematic sectional view of one exemplary embodiment of the layer system according to the present invention from the side.

FIG. 1 shows one exemplary embodiment of layer system 10 according to the present invention. Layer system 10 may, for example, be part of an energy store, a lithium-ion accumulator, for example, or may form same.

Layer system 10 according to the present invention may include a substrate 12 as a carrier. For this purpose, substrate 12 may be used to impart more stability to the layers. However, substrate 12 is only optional and does not necessarily have to be present. For example, substrate 12 may be dispensed with if the layers have sufficient stability. Substrate 12 is formed, for example, from a semiconductor material or MEMS material such as silicon or glass. In addition, substrate 12 may be made of a polymer or a metal.

It is advantageous for the surface of substrate 12 to be electrically insulating. For this purpose, an insulating layer 14 may be provided on substrate 12 if the material of the substrate is not electrically insulating per se. For example, this insulating layer 14 may be a dielectric passivation layer or barrier layer.

Layer system 10 according to the present invention also includes at least three layers which, for example, are arranged on substrate 12, preferably successively. The three layers include a bottom electrode layer 16, a top electrode layer 18, and an electrolyte layer 20 situated between top electrode layer 18 and bottom electrode layer 16. Electrolyte layer 20 covers bottom electrode layer 16 at least partially, preferably completely, and thus separates the two electrode layers 16, 18 from one another.

According to the present invention, electrolyte layer 20 has a solid-state electrolyte. The solid-state electrolyte may, for example, be formed from or based on a material that is selected from the group composed of lithium phosphorus oxynitride (LiPON), lithium sulfur oxynitride (LiSON), lithium metaborate ($LiBO_2$), lithium silicophosphate, in particular doped with nitrogen (LiSiPON), lithium-sulfur-phosphorus compounds ($Li_2S$—$P_2S_5$), lithium, titanium, or tantalum oxides, or lanthanum garnets, preferably lithium phosphorus oxynitride.

In addition, at least one of top 18 or bottom 16 electrode layers has a paste-like composite layer. According to FIG. 1, top 18 and bottom 16 electrode layers have a paste-like composite layer. This layer may include, for example, an active substance, a binder, an electrically conductive material, and an ionically conductive material. In particular, the active substance is selected based on the function of the electrode, in particular a function as an anode or a cathode.

The paste-like composite layer particularly preferably has a storage capacity of $\geq 200$ $\mu Ah/cm^2$, in particular $\geq 500$ $\mu Ah/cm^2$, particularly preferably $\geq 1$ $mAh/cm^2$. Particularly preferred power may thus be achieved, in particular when layer system 10 is used as an energy store.

The functionality of the paste-like composite layer may be improved by adding an auxiliary material or a suitable mixture of auxiliary materials thereto. For example, the electronic or ionic properties and the mechanical properties of the composite layer may be improved by these auxiliary materials. The paste-like composite layer may also include an appropriate electrode material as the auxiliary material, which is a function of the polarity of the particular electrodes. If the electrode layer is to be designed as a cathode, for example, cathode storage materials in particular are suitable here. However, if the electrode layer is to be designed as an anode, anode storage materials in particular are advantageous here.

A bottom current collector layer 22 may be situated beneath bottom electrode layer 16, or a top current collector layer 24 may be situated above top electrode layer 18, i.e., in each case on the side opposite from electrolyte layer 20. Current collector layer 22, 24 is advantageously made of a material having good electrical conductivity, such as a metal, an alloy, or also a polymer having good electrical conductivity. Current collector layer 22, 24 is used in particular to improve the electrical conductivity of bottom electrode layer or top electrode layer 16, 18, respectively, or to pull a contact out from the layer system, i.e., to establish an electrical contact at a suitable location, for example on substrate 12. Corresponding current collector layer 22, 24 should be prevented from making contact with respective complementary current collector layer 24, 22, or with electrode layer 18, 16 which is connected to complementary current collector layer 24, 22, respectively.

Lastly, layer system 10 may include a passivation layer 26 such as a metal layer, a metal-polymer composite, or a ceramic layer or corresponding composite layers, for example having appropriate insulations, in order to enclose system 10, or to cover the corresponding layers for the case that a substrate 12 is present. Degradation of the function due to environmental influences may thus be eliminated or reduced.

Transition areas may arise at the particular boundary transitions of layers 16, 18, 20 due to the differing chemical and mechanical properties. For optimizing or stabilizing the function of the present invention, these transition areas may be defined using intermediate layers which are applied in separate steps. These intermediate layers may, for example, prevent the diffusion of nonfunctional components, auxiliary materials, or foreign ions.

Figure 2:
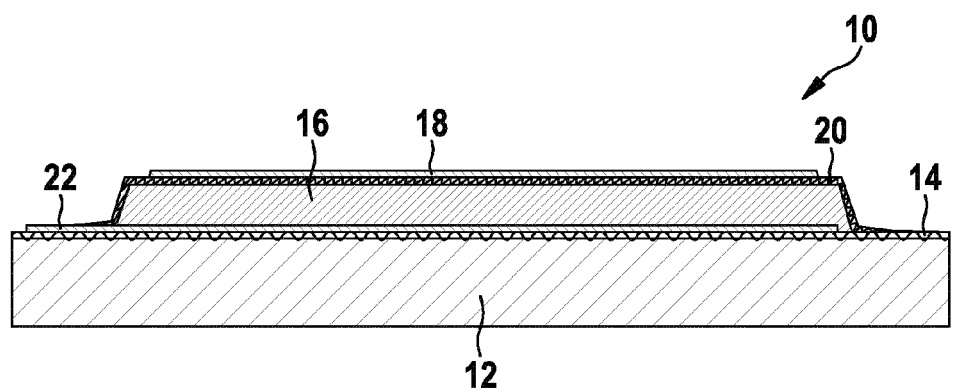
FIG. 2 shows a schematic sectional view of another exemplary embodiment of the layer system according to the present invention from the side.

In the exemplary embodiment according to FIG. 2, only bottom electrode layer 16 has a paste-like composite layer. For the case that this layer is the cathode, top electrode layer 18 may be designed as an anode made of a conventional material which is known for the manufacture of lithium-ion accumulators. For example, the anode in this case may include a material such as silicon, germanium, carbon (graphite, for example), or metallic alloys as well as further anode storage materials mentioned above. This material may be applied directly to electrolyte layer 20 using a suitable process, such as a deposition process, or a composite of such materials with carrier substances, conduction agents, or binders may be used.

Similarly, for the case that bottom electrode layer 16, i.e., the paste-like composite layer, is the anode, the top electrode layer may be formed as the cathode made of a conventional material which is known for the manufacture of lithium-ion accumulators, of which several have been mentioned above and referred to as cathode storage materials. In this case, electrode layer 18 which functions as the cathode may, for example, be deposited directly onto substrate 12 or onto electrolyte layer 20, using a sputtering process, for example, or a composite of such materials with carrier substances, conduction agents, or binders may be used.

Figure 3:
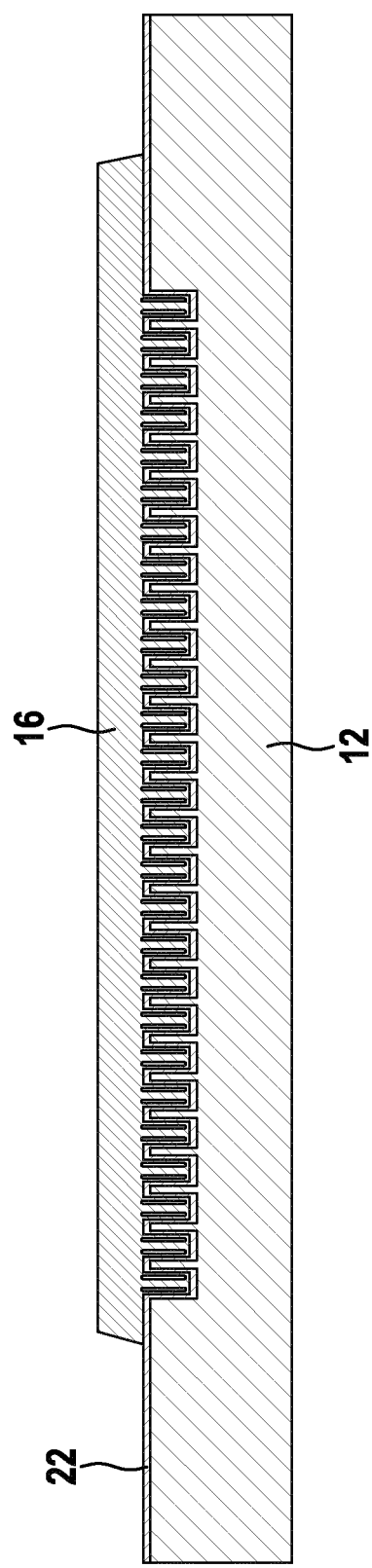
FIG. 3 shows a schematic sectional view of another exemplary embodiment of the layer system according to the present invention from the side.

FIG. 3 shows another exemplary embodiment of layer system 10 according to the present invention, except that only substrate 12, bottom electrode layer 16, and bottom current collector layer 22 are shown here. According to FIG. 3, it is apparent that substrate 12 as well as bottom electrode layer 16 and current collector layer 22 situated in between are structured. According to FIG. 3, a comb- or column-like structure is used. In this way a low, and thus, compact, structure may be formed, and in addition a better transition between electrode layer 16 and current collector layer 22 may be formed.

Figure 4:
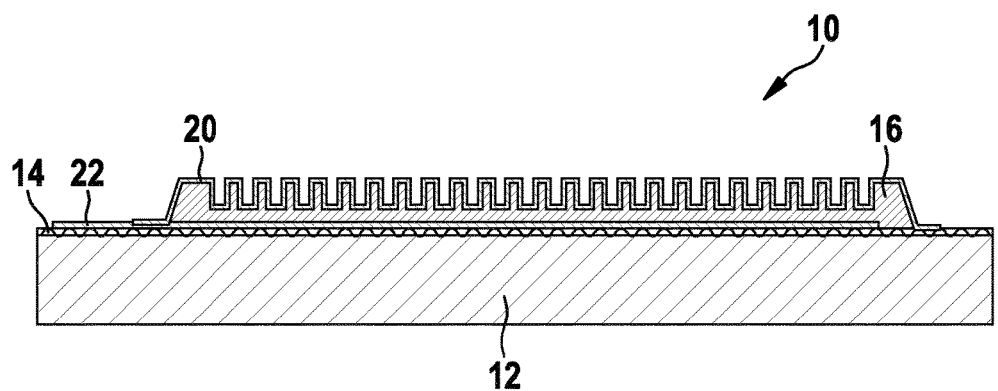
FIG. 4 shows a schematic sectional view of another exemplary embodiment of the layer system according to the present invention from the side.

Another option for the structuring is shown in FIG. 4. According to FIG. 4, the surface of the paste-like composite layer which functions as bottom electrode layer 16, as well as electrolyte layer 20, is structured, likewise having a comb or column structure. This may be achieved, for example, by appropriate screening, or subsequently with the aid of stamping, for example in a calandering step using patterned rollers. It should be ensured that the structured surface also has suitable quality, such as in particular short-wavelength planarity and suitable angles, to be able to apply subsequent solid-state electrolyte layer 20 with the required quality. For structuring according to FIG. 4, the transition surface between the electrodes may be increased, which typically allows increased power, such as from an energy store that is formed by the layer structure.

Figure 5:
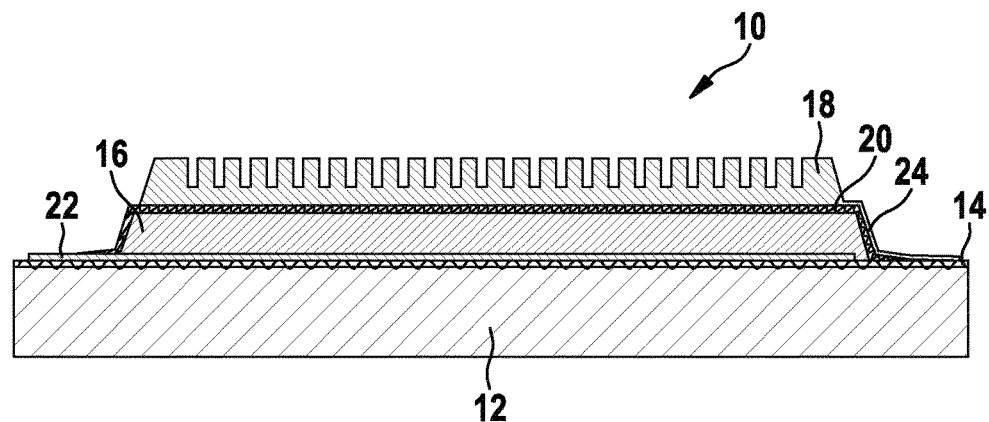
FIG. 5 shows a schematic sectional view of another exemplary embodiment of the layer system according to the present invention from the side.

FIG. 5 shows another exemplary embodiment of layer system 10 according to the present invention. According to FIG. 5, once again a substrate 12 having an insulating layer 14 is shown, on which a bottom current collector layer 22, and following same a paste-like composite layer as bottom electrode layer 16, are situated. Situated on bottom electrode layer 16 is a solid-state electrolyte layer 20, on which a likewise paste-like composite layer as top electrode layer 18 is situated. According to FIG. 5, top electrode layer 18 is structured on its top side, once again having a comb or column structure. This may in turn result in the advantages listed in conjunction with FIG. 3, namely, in particular an improved transition to a current collector layer (not illustrated here) and thus, improved power.

FIG. 6 shows another exemplary embodiment of layer system 10 according to the present invention. According to FIG. 6, all layers, i.e., substrate 12, current collector layers 22, 24, bottom electrode layer 16 and top electrode layer 18, and electrolyte layer 20, are structured in particular with a comb or column structure. In addition, layer system 10 once again includes a passivation layer 26. All advantages shown with reference to FIGS. 3 through 5 are realized in the exemplary embodiment according to FIG. 6. Consequently, layer system 10 has improved power, in particular in an embodiment as an energy store, and in addition this system may have a particularly compact design.

In principle, further layers not shown, such as current collector layers 22, 24 or passivation layers 26, are possible in the exemplary embodiments in FIGS. 2 through 6.

What is claimed is:

1. A layer system, comprising:
a top electrode layer without a substrate supporting the top electrode layer;
a bottom electrode layer without a substrate supporting the bottom electrode layer; and
an electrolyte layer situated between the top electrode layer and the bottom electrode layer, wherein:
the electrolyte layer includes a solid-state electrolyte; and
at least one of the top and bottom electrode layers is formed from a paste-like composite layer and includes at least one of $SiO_2$, $Si_3N_4$, $Al_2O_3$, AlN, MgO, and a glass fiber.

2. The layer system according to claim 1, wherein the paste-like composite layer has a storage capacity of ≥200 µAh/cm2.

3. The layer system according to claim 1, wherein the paste-like composite layer includes an active substance, a binder, an electrically conductive material, and an ionically conductive material.

4. The layer system according to claim 1, wherein the solid-state electrolyte is based on a material that is selected from the group composed of lithium phosphorus oxynitride, lithium sulfur oxynitride, lithium metaborate, lithium-silicon-phosphate doped with nitrogen, lithium-sulfur-phosphorus compounds, lithium, titanium, tantalum oxides, and lanthanum garnets.

5. The layer system according to claim 1, wherein a side of the top electrode layer and/or a side of the bottom electrode layer facing the electrolyte layer, and/or the electrolyte layer, is/are at least partially structured.

6. The layer system according to claim 1, wherein the layers are part of a component that is configured to store energy.

7. The layer system according to claim 1, wherein the paste-like composite layer has a storage capacity of ≥500 µAh/cm².

8. The layer system according to claim 1, wherein the paste-like composite layer has a storage capacity of ≥1 mAh/cm².

9. The layer system according to claim 1, wherein the at least one of the top and bottom layers includes $SiO_2$.

10. The layer system according to claim 1, wherein the at least one of the top and bottom layers includes $Si_3N_4$.

11. The layer system according to claim 1, wherein the at least one of the top and bottom layers includes $Al_2O_3$.

12. The layer system according to claim 1, wherein the at least one of the top and bottom layers includes AlN.

13. The layer system according to claim 1, wherein the at least one of the top and bottom layers includes MgO.

14. The layer system according to claim 1, wherein the at least one of the top and bottom layers includes the glass fiber.

15. A method for producing a layer system or for manufacturing an energy store comprising the layer system, wherein the layer system includes a bottom electrode layer, a top electrode layer, and an electrolyte layer, and does not include a substrate layer, the method comprising:
providing a bottom electrode layer;
applying a solid-state electrolyte layer to at least a portion of the bottom electrode layer; and
applying a top electrode layer to at least a portion of the solid-state electrolyte layer, thereby forming a layered arrangement, wherein at least one of the top and bottom electrode layers is formed from a paste-like composite layer that includes at least one of $SiO_2$, $Si_3N_4$, $Al_2O_3$, AlN, MgO, and a glass fiber.

16. A layer system, comprising:
a top electrode layer;
a bottom electrode layer; and
an electrolyte layer situated between the top electrode layer and the bottom electrode layer, wherein:
the electrolyte layer includes a solid-state electrolyte; and
at least one of the top and bottom electrode layers is formed from a paste-like composite layer and with a comb-shape including a shaft section that extends longitudinally in a first direction and a plurality of teeth that extend from the shaft perpendicularly to the first direction and towards an adjoining layer of the layer system.

17. The layer system according to claim 16, further comprising: a substrate on which the bottom electrode layer is situated.

18. The layer system according to claim 17, wherein a side of the substrate facing the bottom electrode layer is at least partially structured.

19. The layer system according to claim 16, wherein, in a region of the adjoining layer that is adjacent to the plurality of teeth, the adjoining layer meanders around the teeth.

20. The layer system according to claim 19, wherein the adjoining layer is a current collector.

21. The layer system according to claim 19, wherein the electrolyte layer is the adjoining layer.

22. The layer system according to claim 19, wherein each of the top and bottom electrode layers is formed with the comb-shape, with the teeth of each one of the top and bottom electrode layers fitting between respective pairs of teeth of the other of the top and bottom electrode layers, with the adjoining layer meandering form fittingly to the teeth of one of the top and bottom electrode layers on a first side of the adjoining layer and to the teeth of the other of the top and bottom electrode layers on a second side of the adjoining layer.

23. The layer system according to claim 16, further comprising a substrate layer under the bottom electrode layer, wherein:
   the bottom electrode layer is formed with the comb-shape;
   the substrate layer is formed with the comb-shape; and
   the teeth of each one of the bottom electrode layer and the substrate layer fitting between respective pairs of the other of the bottom electrode layer and the substrate layer.

24. The layer system according to claim 23, further comprising a current collector layer between the substrate layer and the bottom electrode layer, wherein, in a region of the current collector layer that is adjacent to the teeth of the bottom electrode layer and of the substrate layer, the currently collector layer meanders form fittingly to the teeth of the substrate layer at a first side of the current collector layer and to the teeth of the bottom electrode at a second opposite side of the current collector layer.

\* \* \* \* \*